(12) United States Patent
Fisher et al.

(10) Patent No.: US 11,433,645 B2
(45) Date of Patent: *Sep. 6, 2022

(54) BUILDING BOARDS WITH INCREASED SURFACE STRENGTH

(71) Applicant: Saint-Gobain Placo SAS, Suresnes (FR)

(72) Inventors: Robin Daniel Fisher, Loughborough (GB); Devang Umesh Khariwala, Hudson, MA (US); Jeffrey Hamilton Peet, Southborough, MA (US); Peter Mayer, Tampa, FL (US)

(73) Assignee: Saint-Gobain Placo SAS, Suresnes (FR)

( * ) Notice: Subject to any disclaimer, the term of this patent is extended or adjusted under 35 U.S.C. 154(b) by 937 days.

This patent is subject to a terminal disclaimer.

(21) Appl. No.: 14/583,897

(22) Filed: Dec. 29, 2014

(65) Prior Publication Data

US 2015/0184387 A1 Jul. 2, 2015

Related U.S. Application Data

(63) Continuation-in-part of application No. 14/143,338, filed on Dec. 30, 2013, and a continuation-in-part of application No. 14/143,421, filed on Dec. 30, 2013.

(51) Int. Cl.
*B32B 13/08* (2006.01)
*E04C 2/04* (2006.01)

(52) U.S. Cl.
CPC .............. *B32B 13/08* (2013.01); *E04C 2/043* (2013.01); *B32B 2255/12* (2013.01);
(Continued)

(58) Field of Classification Search
CPC ......... B32B 13/00; B32B 13/04; B32B 13/08; B32B 13/12; B32B 13/14; B32B 2255/00;
(Continued)

(56) References Cited

U.S. PATENT DOCUMENTS 2,722,262 A 11/1955 Eaton et al.
2,806,811 A 9/1957 Von Hazmburg
(Continued)

FOREIGN PATENT DOCUMENTS

CN 1069475 A 3/1993
DE 102009056015 A1 6/2011
(Continued)

OTHER PUBLICATIONS

McKeen, Film Properties of Plastics and Elastomers, 10 Polyvinyls and Acrylics, 2012, pp. 219-254, Elsevier, United Kingdom.

*Primary Examiner* — Maria V Ewald
*Assistant Examiner* — Ethan A. Utt
(74) *Attorney, Agent, or Firm* — McDonnell Boehnen Hulbert & Berghoff LLP

(57) ABSTRACT

Disclosed is a building board construction with increased surface strength. More specifically, increased nail pull strength is achieved via the application of an external surface coating. The surface coating is ideally applied to a paper faced gypsum building board. In one possible embodiment, the coating is formed from a water soluble polymer.

35 Claims, 7 Drawing Sheets

(52) U.S. Cl.
CPC ....... *B32B 2255/26* (2013.01); *B32B 2307/54* (2013.01); *B32B 2419/00* (2013.01); *B32B 2607/00* (2013.01); *Y10T 428/24488* (2015.01); *Y10T 428/24496* (2015.01); *Y10T 428/24612* (2015.01); *Y10T 428/249968* (2015.04); *Y10T 428/273* (2015.01)

(58) Field of Classification Search
CPC . B32B 2255/12; B32B 2255/26; B32B 29/00; B32B 29/002; B32B 27/00; B32B 27/06; B32B 27/10; B32B 27/12; B32B 27/30; B32B 27/302; B32B 27/306; B32B 27/308; B32B 3/00; B32B 3/02; B32B 3/08; B32B 3/085; B32B 3/10; B32B 3/14; B32B 3/26; B32B 3/263; B32B 13/02; B32B 13/042; B32B 23/00; B32B 23/02; B32B 23/04; B32B 23/046; B32B 23/08; B32B 2607/00; B32B 2419/00; Y10T 428/31971; Y10T 428/31989; Y10T 428/31996; Y10T 428/31855; Y10T 428/2188; Y10T 428/31884; Y10T 428/31888; Y10T 428/31895; Y10T 428/31899; Y10T 428/31902; Y10T 428/31906; Y10T 428/31931; Y10T 428/31935; Y10T 428/31938; Y10T 428/24355; Y10T 428/24364; Y10T 428/24479; Y10T 428/24488; Y10T 428/24521; Y10T 428/24612; Y10T 428/24802; Y10T 428/24934; Y10T 428/3188; Y10T 428/31891; Y10T 428/31993; Y10T 428/2481; Y10T 428/24893; Y10T 428/24901; Y10T 428/24909; C08F 18/08; C08F 218/08; C08F 10/02; C08F 210/02; C08L 23/08; C08L 23/0853; E04C 2/00; E04C 2/02; E04C 2/04; E04C 2/043; E04C 2/049; E04C 2/10; E04C 2/16; E04C 2/20; E04C 2/24; E04C 2/26
USPC ............ 428/688, 689, 702, 703, 532, 537.5, 428/537.7, 500, 507, 508, 509, 510, 511, 428/512, 513, 514, 521, 522, 523, 141, 428/142, 156, 157, 161, 172, 195.1, 196, 428/206, 207, 208, 211.1, 699, 701
See application file for complete search history.

(56) References Cited

U.S. PATENT DOCUMENTS

| | | | |
|---|---|---|---|
| 3,218,183 A | 11/1965 | Fritzsching et al. | |
| 3,256,223 A | 6/1966 | Gustaf | |
| 3,798,854 A | 3/1974 | Hinojosa et al. | |
| 3,814,790 A | 6/1974 | Kato et al. | |
| 3,839,141 A | 10/1974 | McKinnon | |
| 3,850,680 A | 11/1974 | McKinnon | |
| 3,984,596 A | 10/1976 | Failmezger | |
| 4,018,739 A | 4/1977 | Okamoto et al. | |
| 4,579,610 A * | 4/1986 | Kole | E04C 2/043 |
| | | | 428/703 |
| 6,083,619 A | 7/2000 | Frank et al. | |
| 6,087,437 A * | 7/2000 | Farwaha | C08F 210/02 |
| | | | 524/539 |
| 6,706,128 B2 | 3/2004 | Sethuraman | |
| 7,235,288 B2 | 6/2007 | Kajander et al. | |
| 7,238,402 B2 | 7/2007 | Swales et al. | |
| 7,297,396 B2 | 11/2007 | Wang et al. | |
| 7,429,544 B2 | 9/2008 | Grove et al. | |
| 7,745,357 B2 | 6/2010 | Smith et al. | |
| 7,749,928 B2 | 7/2010 | Smith et al. | |
| 7,932,195 B2 | 4/2011 | Smith et al. | |
| 8,092,858 B2 | 1/2012 | Smith | |
| 2001/0001218 A1 | 5/2001 | Luongo | |
| 2001/0014392 A1 | 8/2001 | Bloch et al. | |
| 2002/0128352 A1 | 9/2002 | Soane et al. | |
| 2003/0010419 A1 | 1/2003 | Sethuraman | |
| 2003/0113572 A1 | 6/2003 | Deodhar et al. | |
| 2003/0219580 A1 | 11/2003 | Tagge et al. | |
| 2004/0038065 A1 | 2/2004 | Francis et al. | |
| 2004/0088947 A1 | 5/2004 | Villani et al. | |
| 2004/0126602 A1 | 7/2004 | Wallner | |
| 2004/0154264 A1 | 8/2004 | Colbert | |
| 2004/0170873 A1 | 9/2004 | Smith | |
| 2004/0185231 A1 | 9/2004 | Dimmick | |
| 2005/0202227 A1 | 9/2005 | Kajander | |
| 2005/0202258 A1 | 9/2005 | Swales et al. | |
| 2005/0223947 A1 | 10/2005 | Huang | |
| 2005/0233657 A1 | 10/2005 | Grove et al. | |
| 2005/0250899 A1 | 11/2005 | Bacher et al. | |
| 2006/0029785 A1 | 2/2006 | Wang et al. | |
| 2006/0029786 A1 | 2/2006 | Wang et al. | |
| 2006/0144497 A1 | 7/2006 | Capron | |
| 2006/0147681 A1 | 7/2006 | Dubey | |
| 2006/0240236 A1 | 10/2006 | Bland et al. | |
| 2007/0134421 A1 | 6/2007 | Cheung | |
| 2007/0197114 A1 | 8/2007 | Grove | |
| 2008/0057318 A1 | 3/2008 | Adzima et al. | |
| 2008/0057346 A1 | 3/2008 | Peuramaki | |
| 2008/0141908 A1 | 6/2008 | Peng et al. | |
| 2008/0245012 A1 * | 10/2008 | Boisvert | B32B 13/08 |
| | | | 428/312.4 |
| 2009/0011251 A1 | 1/2009 | Englert et al. | |
| 2009/0087616 A1 | 4/2009 | Hennis et al. | |
| 2009/0178357 A1 | 7/2009 | Francis | |
| 2009/0208714 A1 | 8/2009 | Currier et al. | |
| 2010/0003431 A1 | 1/2010 | Raybuck | |
| 2010/0047461 A1 | 2/2010 | Colbert | |
| 2010/0055431 A1 | 3/2010 | College | |
| 2011/0256372 A1 | 10/2011 | Hauber et al. | |
| 2011/0297291 A1 | 12/2011 | Hauber et al. | |
| 2013/0295286 A1 | 11/2013 | Hauber et al. | |
| 2013/0338270 A1 | 12/2013 | Yu et al. | |

FOREIGN PATENT DOCUMENTS

| | | |
|---|---|---|
| FR | 1384764 A | 1/1965 |
| GB | 803259 A | 10/1958 |
| GB | 806437 A | 12/1958 |
| GB | 1256334 A | 12/1971 |
| GB | 1372898 A | 3/1972 |
| JP | 7109161 | 10/1993 |
| JP | H0648862 A | 2/1994 |
| JP | 2001123122 A | 5/2001 |
| RU | 2114005 | 6/1998 |
| RU | 2208742 | 7/2003 |
| WO | 1999057371 A1 | 11/1999 |
| WO | 2008009763 A1 | 1/2008 |
| WO | 2009006716 A1 | 1/2009 |
| WO | 2009085981 A2 | 7/2009 |
| WO | 2011148075 A1 | 12/2011 |
| WO | 2011148076 A1 | 12/2011 |

* cited by examiner

FAILURE MECHANISM OF NAIL PULL

BUILDING BOARDS WITH INCREASED SURFACE STRENGTH

CROSS REFERENCE TO RELATED APPLICATIONS

This application claims priority to and is a continuation-in-part of U.S. application Ser. No. 14/143,338, filed Dec. 30, 2013, and entitled "Building Boards with Increased Surface Strength" and to U.S. application Ser. No. 14/143,421, filed Dec. 30, 2013, and entitled "Non-Uniform Coatings for Building Boards," the contents of which are fully incorporated herein for all purposes.

TECHNICAL FIELD

This disclosure relates to building boards with increased surface strength. More particularly, the present invention relates to coatings and coating methods that provide for enhanced nail pull strength.

BACKGROUND OF THE INVENTION

Gypsum board is one of the most widely used and versatile building materials in the world. The basic construction for gypsum building boards has remained unchanged for quite some time. This construction includes a core of calcium sulfate dihydrate that is sandwiched between opposing paper sheets. Efforts have been made over the years to increase the strength of gypsum boards. In particular, efforts have been made to increase nail pull strength. Nail pull strength is a standard ASTM measurement. Higher nail pull strength ensures that boards can be securely fastened to associated framing members. To date, efforts to increase nail pull strength have focused on core materials, additives, and core density. The drawback with such efforts is that they require larger quantities of material and increased board weight to reinforce the core.

An example of gypsum board with increased strength is illustrated in U.S. Pub. 2004/0154264 to Colbert. This publication discloses a coated gypsum board having a facing sheet. A coating is disposed on at least a portion of the facing sheet and at least a portion of the coating penetrates into the facing sheet and/or the gypsum core. In an additional embodiment, the gypsum board further comprises a backing sheet on the second side of the gypsum core. In one aspect, the coating may penetrate into the gypsum core to a substantially uniform depth across an area of the gypsum board. A gypsum board with such a coating exhibits a nail pull value of greater than 80 pounds.

U.S. Pub. 2005/0233657 to Grove discloses a gypsum or foam facer that is formed by the direct in-line or off-line coating of a pre-impregnated, fibrous network matting with a secondary binder system. The pre-impregnated fibrous network is preferably formed of a randomly oriented wet use chop strand fiber material impregnated with a modified urea-formaldehyde binder system. The secondary binder system preferably consists of low glass transition acrylic or styrene-butadiene-rubber resin filled predominantly with fillers combined with a plate like reinforcement or fibrous reinforcement.

Although the above referenced inventions achieve their own individual objectives, all suffer from common drawbacks. Namely, none of the background art addresses the use of coatings or coating techniques that increase nail pull strength while minimizing board weight. The building boards of the present disclosure are designed to overcome these and other deficiencies present in the background art.

SUMMARY OF THE INVENTION

The building boards of the present disclosure provide an advantage by exhibiting increased surface strength without appreciable increases to overall board weight.

Another advantage is realized by increasing the nail pull strength of a building board via the application of a surface coating.

An advantage is also recognized by selecting a surface coating that complements the tensile strength of the underlying paper face.

Still yet another advantage is achieved by increasing nail pull strength via the application of certain water soluble or dispersible polymer coatings.

A further advantage is accomplished by applying polymer coatings after board production via wet coating techniques.

A further advantage is the discovery that beneficial nail pull strengths can be achieved with coating weights below those found in the prior art.

Another possible advantage is attained by providing a coating that is applied in a non-uniform manner across the surface of the board.

A further advantage is realized by applying thicker surface coatings in locations that typically encounter greater loads.

Yet another advantage is recognized by reducing both board weight and cost via the targeted application of surface coatings.

Another advantage is realized by providing a building board with increased nail pull strength that can be made inexpensively.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF THE DRAWINGS

Figure 1:
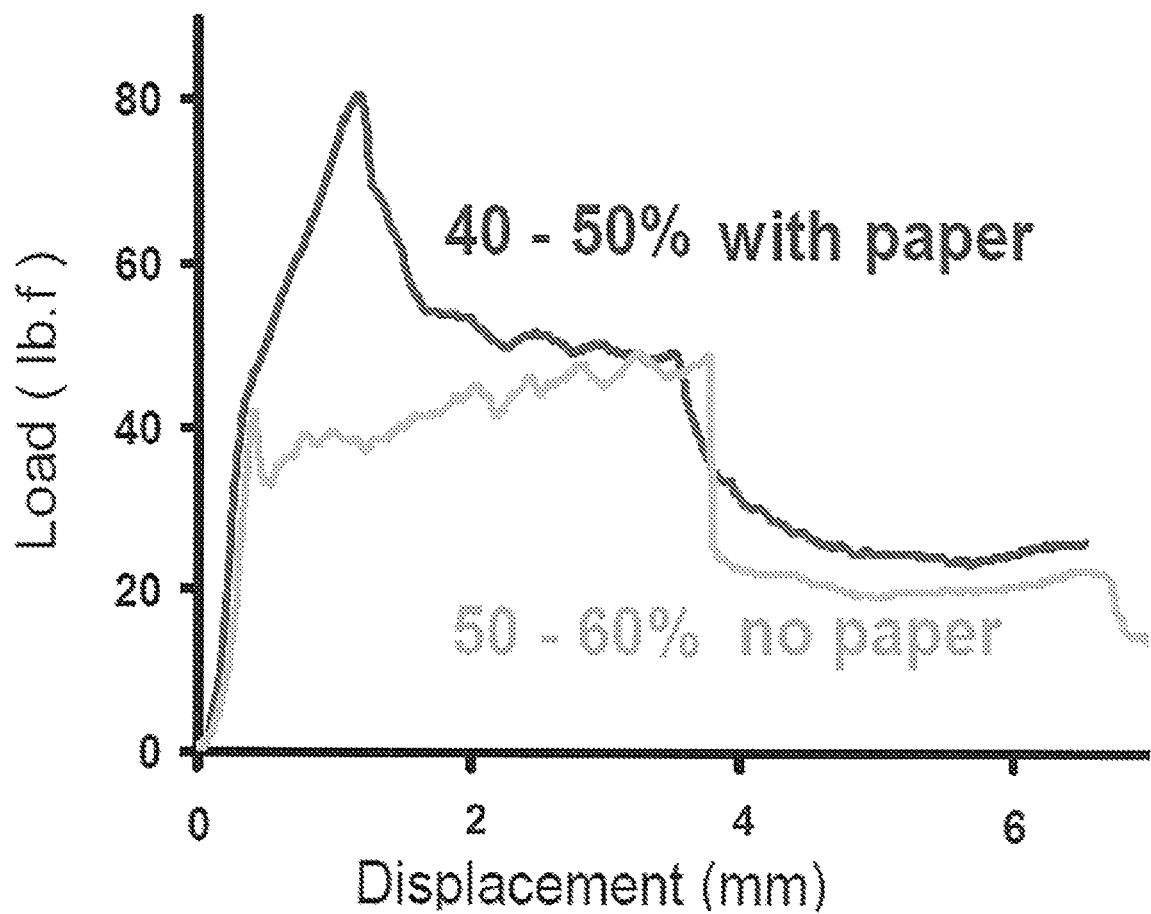
FIG. 1 is a graph of load versus displacement for a paper faced board and a non-paper faced board.

The present disclosure relates to increasing the surface strength of building board via the application of external coatings. The coating is ideally applied to a paper faced building board to increase nail pull strength. In one possible embodiment, the coating is formed from a water soluble polymer. In yet another embodiment, the coating is applied in a non-uniform manner to account for varying loads across the surface of the board. The various details of the present disclosure, and the manner in which they interrelate, are described in greater detail hereinafter.

In a preferred but non-limiting example, the building board is a gypsum based building board. The general construction of gypsum board is well known and includes a core of calcium sulfate dihydrate that is sandwiched between opposing paper sheets. This core is initially deposited in the form of a slurry of calcium sulfate hemihydrate ($CaSO_4 \cdot \frac{1}{2}H_2O$) and water. Once the slurry is deposited, it is rehydrated to form gypsum.

It is also known in the art to use various additives within the gypsum core. One such additive is starch. Starch can be added prior to rehydration. Starch functions as a binder within set gypsum and yields boards with higher compressive and flexural strength. It also strengthens the edges of the resulting board and improves paper bond to the core. The gypsum core contemplated herein may optionally include additives such as starch.

The gypsum core of the present disclosure may also include a plurality of internal voids to reduce the overall weight of the board. It is known in the art to form voids within the interior of gypsum board as a means for reducing the board weight. One technique is described in U.S. Pat. No. 6,706,128 to Sethuraman. Sethuraman '128 discloses a method for adding air bubbles of different relative stabilities, whereby the air bubbles do not rupture before the slurry sets sufficiently to prevent the slurry from filing the void spaces left behind by ruptured bubbles. The result is a gypsum board with internal voids and with reduced weight. Other suitable techniques for void formation will be apparent to those of ordinary skill in the art.

In accordance with one embodiment, a coating is applied to one of the paper liners. Although the coating can be applied to either, or both, of the liners, it is preferred that the coating is applied to the liner forming the decorative outer face of the building board. Any of a variety of wet coating techniques (e.g., spray coating, slot die coating, roll coating, or dip coating) can be used. As explained below, the coating is designed to increase nail pull strength without appreciably increasing the weight of the building board. The coating may form the decorative external face of the board. In this regard, various known matting agents may also be added to reduce gloss of the coating and otherwise make it more aesthetically pleasing. However, the coating need not form the external face of the resulting board. Rather, the coating may be used as a primer or pre-primer to ensure adequate adhesion to subsequently applied coatings.

FIG. 1 plots load (in pounds force) versus nail displacement in millimeters. The top most line shows that 40-50% of the nail pull strength is attributed to the paper liner. This reflects the increased nail pull strength achieved by providing a paper face. The lower line reflects that in the absence of a paper liner 50-60% of the nail pull strength is attributed to the core materials. Overall this chart demonstrates that paper facing contributes more significantly to the nail pull peak load than previously realized. The present disclosure capitalizes on this finding by increasing nail pull strength via the application of surface coatings.

Surface strength is further increased by selecting a coating material that complements the tensile properties of underlying paper liner. The best coating materials are not the strongest materials but those which have the highest strength at the elongation required to match the failure of the paper. By utilizing such coatings, the destruction of the liner is delayed for as long as possible while the board is under load. It will also preferably to select coatings that best adhere to the paper and serve to reinforce the cellulose fibers within the paper itself. The preferred coating materials are listed below in Table 1.

Figure 2:
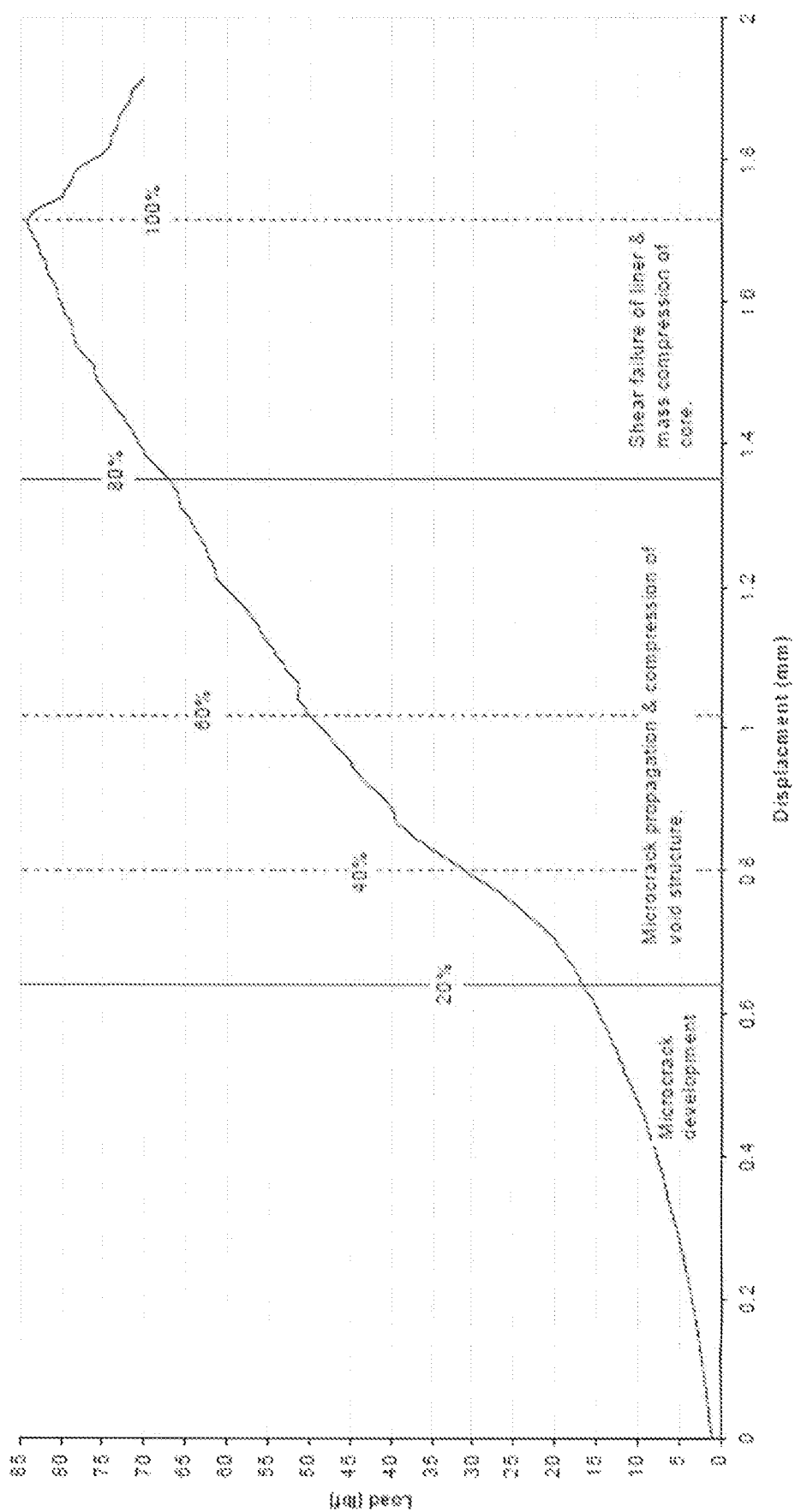
FIG. 2 is a is a graph of load versus displacement for a paper faced board indicating the mode of failure in each region of the measurement

It is also known that peak nail pull strength occurs immediately prior to the destruction or tearing of the paper face. This is demonstrated in FIG. 2, which plots load versus displacement in a nail pull test. This plot contains descriptions of the failure processes occurring during the test based on a series of SEM cross sections taken at various points during the test. FIG. 2 illustrates that the failure mechanism can be broken down into four segments. In the first segment, the load causes microcracks to develop within the board. Next, under increasing loads, the microcracks propagate and internal voids are compressed. In the third segment, there is a compression of the core and a shear failure of the liner. Finally, at the peak load, the paper tears.

Figure 3:
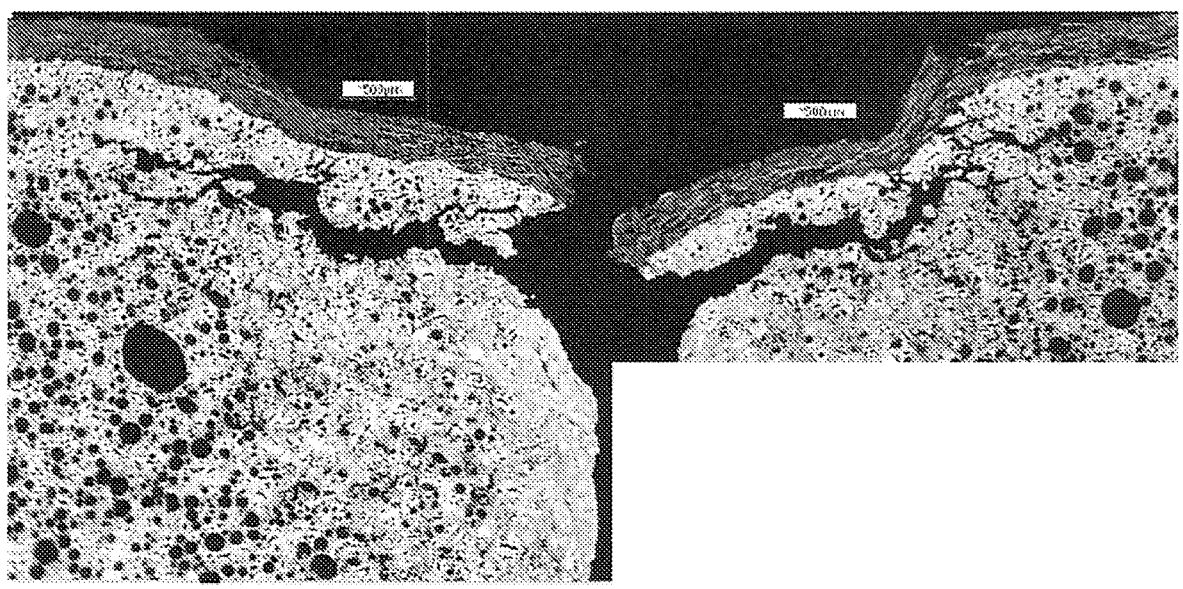
FIG. 3 is an SEM cross section of a paper faced board after peak load in a nail pull measurement.

FIG. 3 contains a cross sectional scanning electron microscope image of a composite building board immediately after peak load in a nail pull test. It can be seen on the right side of the image that the paper has just failed at the paper surface in tensile strain. This indicates that a coating which can reinforce the surface of the paper or better distribute the tensile load can serve to significantly increase the peak nail pull strength.

Table 1 contains various polymers used as coatings on building boards and the effect on board nail pull strength. The percentage nail pull (NP) increase is measured relative to an uncoated board.

TABLE 1

| Number | Coating | Method | Coverage (g/sf) | % NP increase |
|---|---|---|---|---|
| 1 | Nanocellulose (Strong & Hard) | Blade | 2 | 1 |
| 2 | Titebond Wood glue (Hard) | Blade | 3.5 | −1 |
| 3 | Bostic Wood Glue (Flexible) | Blade | 3.5 | 15 |
| 4 | PVOH 24-203 (Low Mn, 88% H) | Blade | 1.5 | 5 |
| 5 | PVOH 09-523 (High Mn, 88% H) | Blade | 1.5 | 13 |
| 6 | PVOH 03-325 (High Mn, 98% H) | Blade | 1.5 | 10 |
| 7 | PVOH 09-523 (High Mn, 88% H) | Blade | 2 | 14 |
| 8 | PVOH 09-523 (High Mn, 88% H) | Blade | 1 | 7 |
| 9 | PVOH 09-523 (High Mn, 88% H) | Blade | 0.5 | 5 |
| 10 | VAE 10A (Tg = 5) | Blade | 2 | 13 |
| 11 | VAE EU (Tg = 10) | Blade | 2 | 16 |
| 12 | VAE 909 (Tg = 15) | Blade | 2 | 18 |
| 13 | VAE 909 (Tg = 15) | Blade | 2 | 21 |
| 14 | VAE 909 (Tg = 15) | Mayer Rod | 4 | 19 |
| 15 | VAE 909 (Tg = 15) | Mayer Rod | 2 | 19 |
| 16 | VAE 909 (Tg = 15) | Mayer Rod | 1 | 21 |
| 17 | VAE 909 IR Annealed | Mayer Rod | 2 | 9 |
| 18 | VAE 909 IR Annealed | Mayer Rod | 1 | 6 |
| 19 | VAE 10A IR Annealed | Mayer Rod | 1 | 10 |
| 20 | VAE (Tg = 28) | Mayer Rod | 2 | 0 |
| 21 | SBR 246 (Tg = 15) | Mayer Rod | 4 | 14 |

Some illustrative examples are listed below.

Comparing the nail pull enhancement of coatings Numbers 1, 2, and 3 in Table 1 above indicates that strength alone is not sufficient for significant nail pull enhancement. Nanocellulose is an extremely high strength material that is effective at paper strengthening when applied as a coating. While the tensile strength of the material is high, however, the elongation at break is quite low and thus the material does not add to nail pull strength. This is because the coating fails before the paper in the nail pull test and the peak load in the nail pull test comes at the point of paper failure.

Similarly, comparing the Bostic and Titebond wood adhesives indicates that the tougher, more flexible adhesive provides a significant enhancement to nail pull. On the other hand, the strong, hard, and brittle Titebond has no significant effect.

If there is a large coat weight of a very hard material, the nail pull can be increased, but at high cost. When hard epoxy resins were tested the nail pull strength could be increased significantly, but the peak load was entirely being derived from the strength of the coating and thus a large coat weight was needed to achieve the result. In the case of the very thin, ductile coatings, the coating ideally fails at the same time as the paper and serves to increase the strength of the paper itself as they are too thin to provide the strength on their own.

From poly vinyl alcohol (PVOH) coatings Numbers 4-9 in Table 1, several conclusions can be reached. For one, the high molecular weight material is significantly stronger than the low molecular weight material and thus increases the nail pull strength more (presumably they have a similar degree of ductility/elongation). Secondly, the percent hydrolysis does not seem to have a major impact. Finally, it was shown that the effect can occur on even very low coat weights of ~1 g/ft2.

Low viscosity vinyl acetate ethylene ("VAE") copolymer coatings are designed to penetrate into paper and increase the toughness of paper. They are strong and flexible coatings which can be either cross linked or not cross linked. When cast and dried in air (film Numbers 10-16 in Table 1), the strength increases with glass transition temperature ("Tg" measured in degrees Celsius). This implies the low Tg material is actually a bit too soft. After IR cross-linking (film Numbers 17-19 in Table 1), however, the low Tg film is a bit stronger than the high Tg film. This implies that the trade-off between strength and ductility can be tuned either by the polymer Tg or by the degree of cross linking in the VAE system. Based on the nail pull data versus coverage, there seems to be little effect of film thickness on the nail pull enhancement.

From Table 1, the preferred coating polymers are the high molecular weight poly vinyl alcohol (numbers 5-9), the vinyl acetate ethylene with Tg=15 (numbers 12-15), and the syrene butadiene copolymer (number 21). It is also beneficial to provide polymer coatings with a tensile modulus above 500 psi and an elongation at break of greater than 500% at room temperature. The coating polymer may have an elongation at break of between approximately 500% and 10,000%. The coating polymer may have a tensile modulus between approximately 500 psi and 10,000 psi. The coating may also have a viscosity of between 20 to 2000 centipoise. VAE based coatings are preferably less than 100 microns thick. In the preferred embodiment, the VAE coatings are between 20-30 microns thick as applied to the surface of the board. For PVA based coatings, 10 microns is preferred. Coating thicknesses greater than 1 g/ft$^2$ are also preferred with thicknesses of approximately 1.5 g/ft$^2$ being most preferred.

Figure 4:
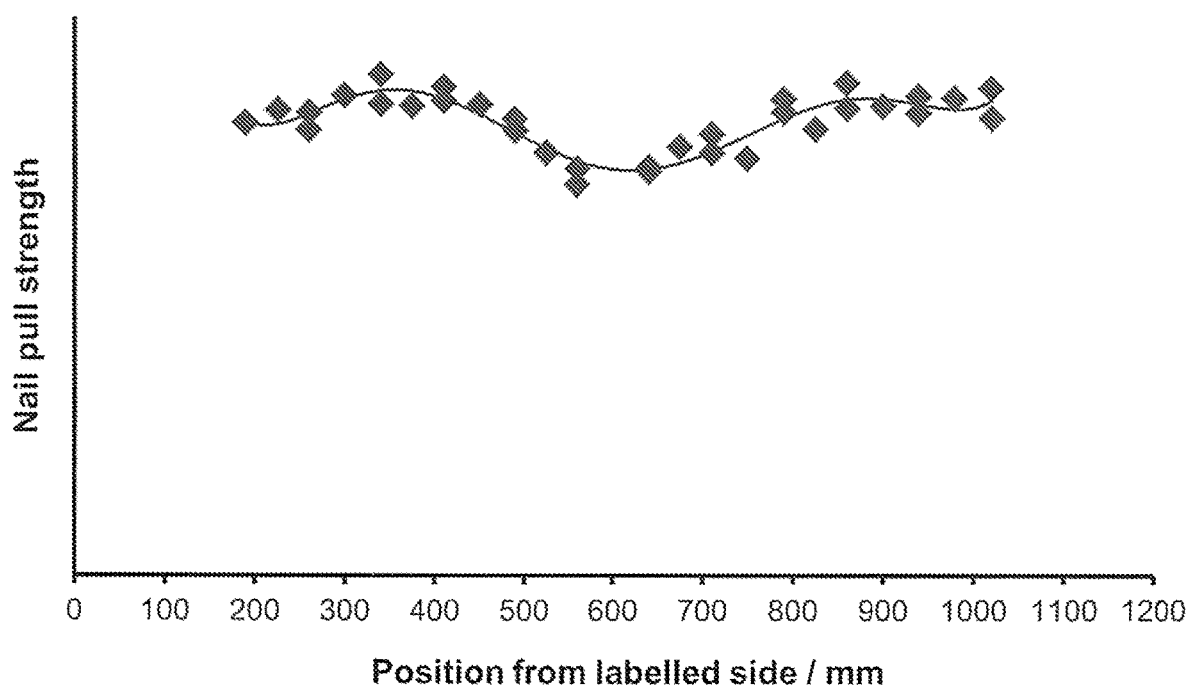
FIG. 4 is a chart indicating the normal variation of nail pull strength across the width of a composite building board.

It is also preferred to apply the selected coating to the surface of the paper in an uneven or non-uniform manner. Ideally, the coating is thicker in those areas that are likely to encounter the greatest surface loads. In other words, the coating coverage is greater in those areas with the lowest nail pull strength. FIG. 4 contains a plot of the nail pull strength of an uncoated composite building board across the width of the board. The plotted line shows that the nail pull strength is weakest in the area around the center of the board. Likewise, the edges of the board demonstrate the greatest degree of nail pull strength. In accordance with the invention, the coatings described above can be applied in greater amounts along the center line of the board and in lesser amounts along the edges. In some embodiments, the anticipated nail pull strength may dictate that no coatings be applied in select areas. The objective of this targeted application is to effectively smooth out the plotted line in FIG. 4 so as to achieve a more uniform nail pull strength across the entire board surface. Other plots with varying shapes, beyond that of FIG. 4, could similarly be generated based upon varying board geometry, core materials, and/or intended uses. Surface coating thicknesses would be varied depending upon the anticipated nail pull strength variance across the board surface.

Polymer Coating Formulations

In addition to the above referenced polymer coatings, the present inventors also tested a number polymer formulations. These formulations broadly included a polymer as a major component in addition to a silica and a defoamer. Various coating techniques were also tested. Table 2 lists formulation 909 #17/02, which consists primarily of an emulsion polymer sold by Celanese Corporation of Dallas, Tex. under the trademark Dur-o-Set®. In particular, this formulation consists of approximately 89.9% of Dur-o-Set 909 (as a percentage of total solids). Dur-o-Set 909 is a cross linking polymer. Namely, the polymer cross-links with itself when heated. Dur-o-Set 909 works well because the cross-linking does not result in brittleness, which is detrimental to nail pull strength. This formulation further includes water and silica. In the exemplary formulation, the formulation includes approximately 9.9% of an Acematt® HK400 untreated fine-grained precipitated silica from Evonik Industries AG. A blue dye was included for testing purposes so that the distribution of the coating upon the board could be more readily observed. In practice, the dye would be replaced by defoamer, such as the Foamaster® 111 brand defoamer from BASF Corporation is utilized. Table 2 lists also lists the components on a total weight basis and solid weight basis (in grams). Approximately 25.0% of the formulation of Table 2 included solids.

TABLE 2

| 909 #17/02 | | | |
|---|---|---|---|
| 909 #17/02 | Weight (g) | Solids (g) | Total solids (%) |
| Water | 131.7 | 0 | 0.0 |
| Dur-o-set 909 | 112.5 | 56.3 | 89.9 |
| HK400 silica | 6.2 | 6.2 | 9.9 |
| Blue dye | 0.1 | 0.1 | 0.2 |
| Total | 250.6 | 62.6 | 100.0 |

The second formulation, 405 #17/02, is listed in Table 3 and is the same in most respects as the 909 #17/02 formulation. However, the Dur-o-Set 909 polymer is replaced with EcoVAE 405, which is a vinyl acetate/ethylene emulsion that is similarly sold by Celanese Corporation. However, EcoVAE 405 is a non-cross linking polymer. EcoVAE 405 is desirable because it creates a ductile polymer that complements the strength of the underlying paper and increases nail pull strength. Approximately 27.2% of the formulation of Table 3 included solids.

TABLE 3

| 405 #17/02 | Weight (g) | Solids (g) | Total solids (%) |
|---|---|---|---|
| Water | 131.7 | 0 | 0.0 |
| EcoVAE 405 | 112.5 | 61.9 | 90.8 |
| HK400 silica | 6.2 | 6.2 | 9.1 |
| Blue dye | 0.1 | 0.1 | 0.1 |
| Total | 250.6 | 68.2 | 100.0 |

Table 4 lists the results of applying both coating formulations to a gypsum board and testing for nail pull improvement. In each case the coating was applied via a draw down coating technique via the use of a Meyer rod. The thickness of the wet coating along with the corresponding board weight are also listed. Nail pull improvement is listed as nail pull index improvement (NPI). NPI is computed in accordance with the following equation: $NPI = NP/Wt \times 0.05$, where NP is average nail pull resistance in pounds force and Wt is the weight of the board in lbs/MSF.

TABLE 4

| Formulation | Wet thickness (μm) | Board weight (lbs/MSF) | Nail pull index improvement (%) |
|---|---|---|---|
| 909 #17/02 | 40 | 1407 | 8.7 |
| | 60 | 1415 | 9.2 |
| | 80 | 1409 | 10.6 |
| | 100 | 1381 | 8.5 |
| 405 #17/02 | 40 | 1388 | 3.6 |
| | 60 | 1395 | 6.5 |
| | 80 | 1401 | 7.1 |
| | 100 | 1403 | 11.0 |

Tables 5-6 illustrate the 909 #20/02 coating and the 405 #20/02 coatings. These coatings generally correspond to the coating formulations noted above in Tables 2-3. The 909 #20/02 formulation included 24.9% total solids. The 405 #20/02 formulation included 27.1% total solids. In each instance, the coating was applied to the board using an airless spray coating technique. This resulted in much higher coating weights.

TABLE 5

| 909 #20/02 | Weight (g) | Solids (g) | Total solids (%) |
|---|---|---|---|
| Water | 5268.6 | 0 | 0.0 |
| Dur-o-set 909 | 4465 | 2232.5 | 89.9 |
| HK400 silica | 248.1 | 248.1 | 10.0 |
| Blue dye | 4.0 | 4.0 | 0.2 |
| Total | 9985.7 | 2484.6 | 100.0 |

TABLE 6

| 405 #20/02 | Weight (g) | Solids (g) | Total solids (%) |
|---|---|---|---|
| Water | 5268.6 | 0 | 0.0 |
| EcoVAE 405 | 4465 | 2455.8 | 90.7 |
| HK400 silica | 248.1 | 248.1 | 9.2 |
| Blue dye | 4.0 | 4.0 | 0.1 |
| Total | 9985.7 | 2707.9 | 100.0 |

Table 7 shows the 909 #20/02 and 405 #20/02 formulations applied via an airless spray coating alternatively using low and high pressure settings. In each case the resulting dry coverage (in grams per square foot) was 2.1 g/ft² or less. The resulting normalized nail pull index (NPI) ranged from a high of 11.4 to a low of 5.2.

TABLE 7

Airless Spray Coatings

| Formulation | Pressure setting | Actual dry coverage (g ft$^{-2}$) | Board weight (lbs/MSF) | Nail pull index improvement (%) |
|---|---|---|---|---|
| 909 #20/02 | Low | 0.7 | 1374 | 5.7 |
| | High | 0.8 | 1373 | 5.4 |
| | Low | 0.9 | 1386 | 6.2 |
| | High | 1.1 | 1389 | 8.5 |
| | Low | 1.8 | 1399 | 11.4 |
| | High | 1.7 | 1404 | 10.4 |
| | Low | 2.1 | 1413 | 10.8 |
| | High | 2.0 | 1385 | 10.1 |
| 405 #20/02 | Low | 0.9 | 1382 | 5.2 |
| | High | 0.7 | 1377 | 6.7 |
| | Low | 1.0 | 1383 | 7.9 |
| | High | 1.1 | 1393 | 8.5 |
| | Low | 1.8 | 1395 | 10.0 |
| | High | 1.4 | 1401 | 9.7 |
| | Low | 2.0 | 1392 | 8.6 |
| | High | 2.3 | 1402 | 9.6 |

Air atomized spray coatings were also investigated. The results of this investigation are listed below in Tables 8-11. Table 8 sets forth a coating formulation including water, Dur-o-set 909, HK400 Silica, and a Foamaster® 111 brand defoamer from BASF Corporation. A small amount of a Surfynol 104PG50 surfactant was also included. The total solids was approximately 25%.

TABLE 8

| 909 #15/08 | Weight (g) | Solids (g) | Total solids (%) |
|---|---|---|---|
| Water | 2875.0 | 0 | 0.0 |
| Dur-o-set 909 | 2425.0 | 1212.5 | 89.2 |
| HK400 silica | 135.9 | 135.9 | 10.0 |
| Foamaster 111 | 9.9 | 9.9 | 0.7 |
| Surfynol 104PG50 | 0.9 | 0.9 | 0.1 |
| Total | 2061.5 | 721.5 | 100.0 |

A formulation including a latex binder was also tested as noted in Table 9 The specific latex binder employed was the latex binder (DL 490NA from Styron).

TABLE 9

| SBR #03/09 | Weight (g) | Solids (g) | Total solids (%) |
|---|---|---|---|
| Water | 2875.0 | 0 | 0.0 |
| Latex DL 490NA | 2425.0 | 1115.5 | 88.4 |
| HK400 silica | 135.9 | 135.9 | 10.8 |
| Foamaster 111 | 9.9 | 9.9 | 0.8 |
| Surfynol 104PG50 | 0.9 | 0.9 | 0.1 |
| Total | 2061.5 | 721.5 | 100.0 |

The results from the two coating, each applied via an air atomized spray coating, are listed below. This table lists the pressure of the air atomized spray coating apparatus as well as the resulting dry coverage of the board. Normalized nail pull is also listed.

TABLE 10

Air Atomized Spray Coatings

| Formulation | Atomizing air pressure (bar) | Actual dry coverage (g/ft$^2$) | Board weight (lbs/MSF) | Nail pull index improvement (%) |
|---|---|---|---|---|
| 909 #15/08 | 1.2 | 1.6 | 1399 | 8.0 |
|  | 1.5 | 2.1 | 1398 | 8.6 |
|  | 2.0 | 2.1 | 1397 | 9.6 |
| SBR #03/09 | 1.2 | 1.4 | 1375 | 9.6 |
|  | 2 | 1.5 | 1378 | 8.3 |
|  | 2 | 2.4 | 1374 | 10.1 |

Figure 5:
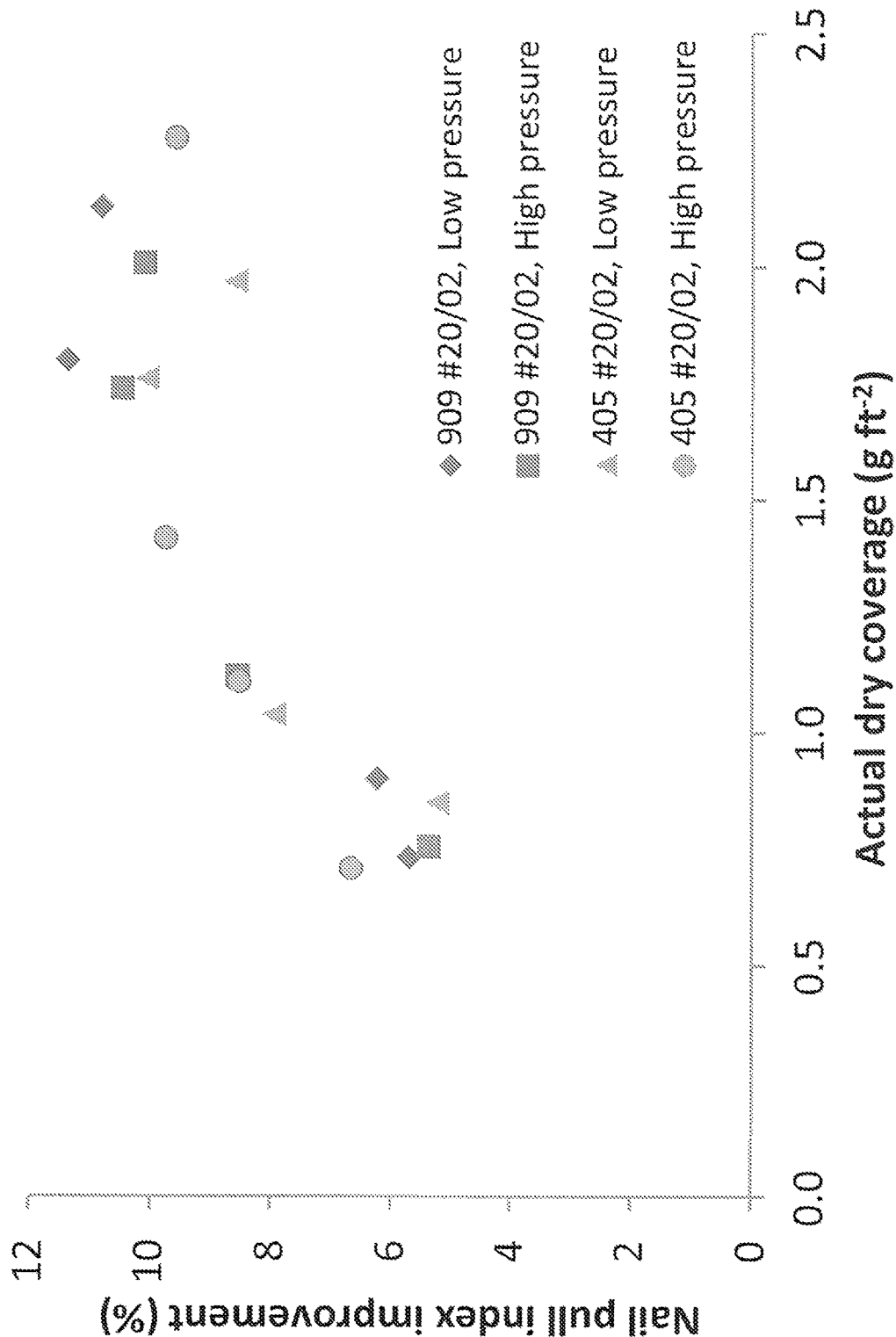
FIG. 5 is a chart plotting nail pull index versus dry weight coverage as applied via an airless spray coating technique.
Figure 6:
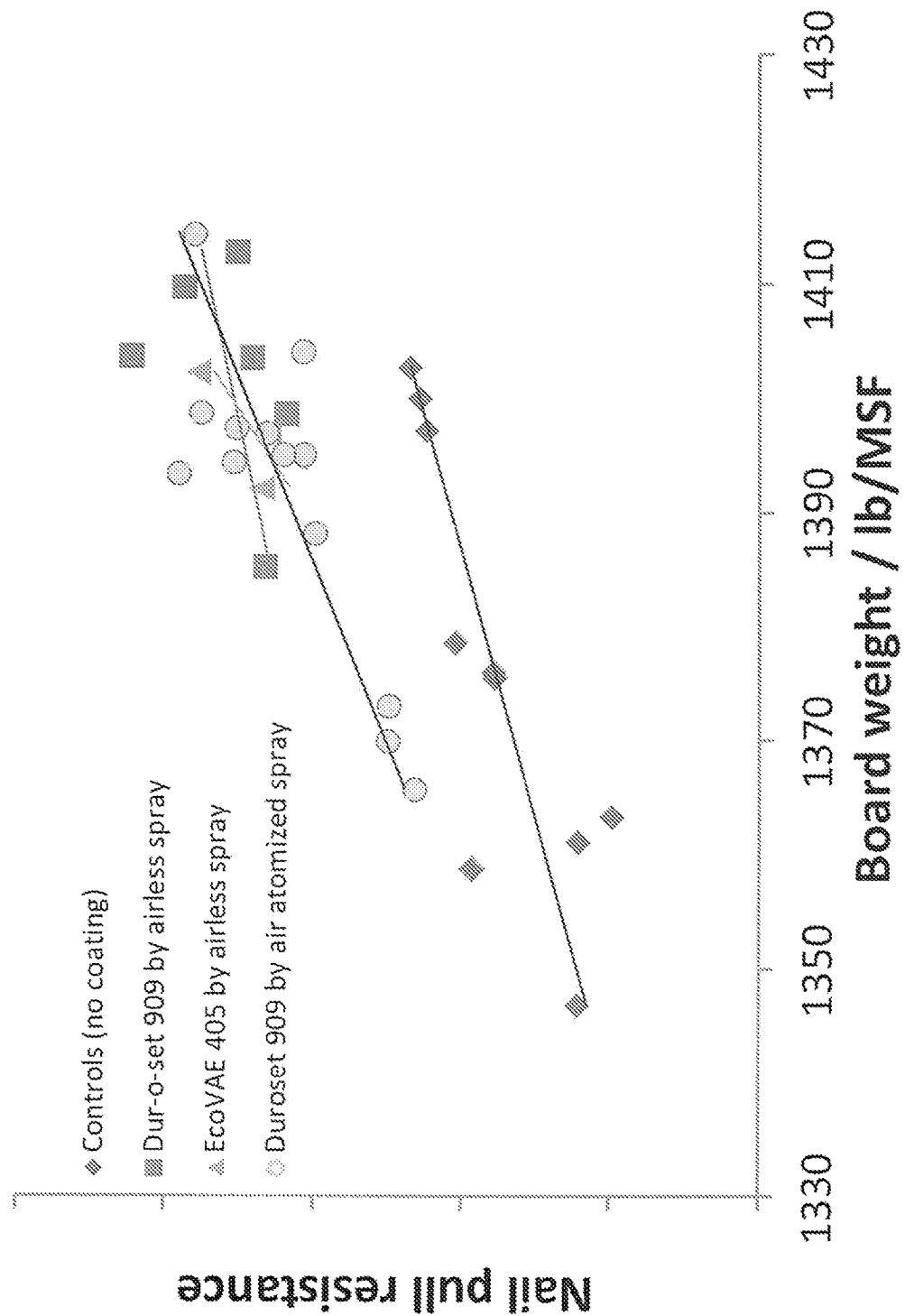
FIG. 6 is a chart plotting nail pull resistance versus board weight for both airless and air atomized spray coating techniques.

FIG. 5 plots the results of the 909 #20/02 and 405 #20/02 formulations as applied via an airless spray coating technique. The figure plots nail pull index relative to actual dry coverage of the board. It was determined that lower atomizing air pressures worked better as they left a sufficient amount of the board uncoated and thereby permitted entrained water vapor to escape through the surface of the board during drying. Coatings applied via higher pressures resulted in less desirable, finer spray patterns and often resulted in too much of the surface being coated. The present inventors have discovered that leaving approximately 20% of the board face uncoated yields sufficient permeation. In the preferred embodiment, between 10% and 20% of the board surface is uncoated. Nail pull index improvements of 10% or greater were achieved. FIG. 6 plots nail pull resistance versus board weight for the Dur-o-Set 909 and Eco-VAE 405 formulations. Both airless sprays and air atomized spraying techniques were employed. Again, significant improvements in nail pull strength were realized.

Figure 7:
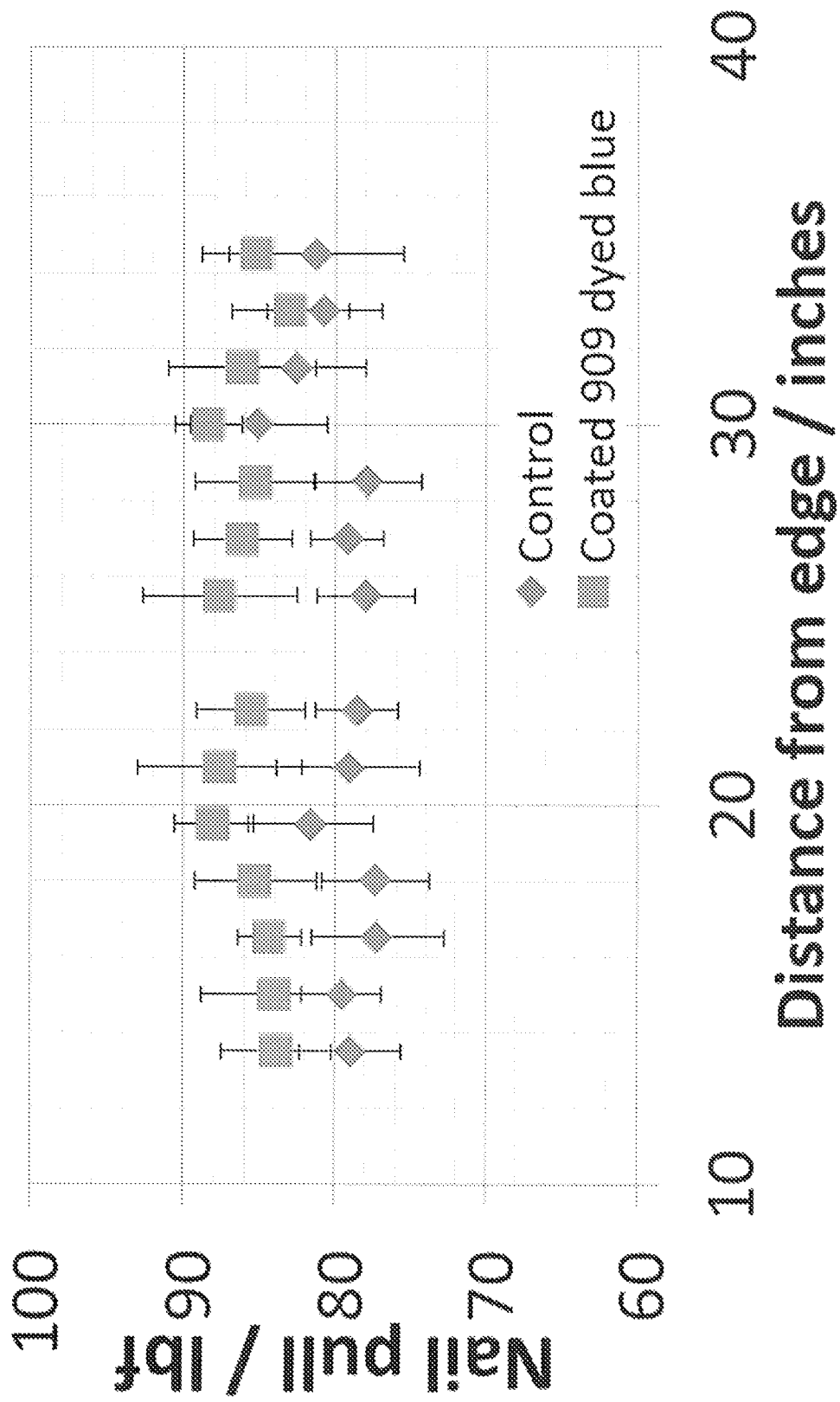
FIG. 7 is a chart plotting nail pull versus distance from the edge of the board.

In one particular test of the 909 #15/08 formulation, the coating was applied with an airless spray coater mounted in-line at a gypsum wallboard factory with approximately a 30 psi pressure. The coating was applied to the gypsum board having an uncoated weight of 1440 lb/MSF (pounds per 1000 square feet). The resulting coated weight of the board was 1448 lb/MSF. The increase in nail pull index was between 8-10%. Thus, the 909 #15/08 formulation can increase nail pull strength by as much as about 10% while contributing very little to board weight. FIG. 7 illustrates nail pull variation across the surface of the production boards with and without the coating.

Table 11 includes data relating to the air atomized coating of a Styron Latex DL 490NA Styrene-butadiene polymer. Table 12 includes data relating to the air atomized coating with the Dur-o-Set 909. In each case, atomizing air pressures of 2 bar would prove problematic in a factory setting as they would fail to allow sufficient permeation. Air pressures of around 1.2 bars were considered ideal as they provided a sufficiently coarse spray pattern.

TABLE 11

Air Atomized Styron Latex DL 490NA SBR

| Air Pressure (bar) | Dry Coverage g/ft2 | Board Weight lb/MSF | Nail Pull Index % increase |
|---|---|---|---|
| Control 1 | — | 1376 | — |
| 1.2 | 1.4 | 1375 | 9.6 |
| 2.0 | 1.5 | 1378 | 8.3 |
| 2.0 | 2.4 | 1374 | 10.1 |

TABLE 12

Air Atomized Dur-o-Set 909 VAE

| Air Pressure (bar) | Dry Coverage g/ft2 | Board Weight lb/MSF | Nail Pull Index % increase |
|---|---|---|---|
| Control 5 | — | 1397 | — |
| 1.2 | 1.6 | 1399 | 8.0 |
|  |  | 1394 | 11.0 |
| 1.5 | 2.1 | 1395 | 11.4 |
|  |  | 1398 | 8.6 |
| 2.0 | 2.1 | 1397 | 9.6 |
|  |  | 1388 | 8.2 |

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A composite building board with enhanced nail pull strength, the composite building board comprising:
   first and second paper liners each having an interior face, the first paper liner having an exterior face forming a decorative outer face of the building board;
   a set plaster core positioned between and bonded with the interior face of the first paper liner and the interior face of the second paper liner, the set plaster core formed from a cementitious slurry of predominantly calcium sulfate hemi-hydrate, the set plaster core being formed with a plurality of internal voids, the internal voids functioning to decrease the overall weight of the building board; and
   a polymer based spray coating applied directly to the exterior face of the first paper liner wherein the coating comprises less than 10 grams of polymer per square foot of the decorative outer face, the spray coating leaving between about 10% to about 20% of the first paper liner uncoated, the spray coating having a tensile modulus above 500 psi and an elongation at break of greater than 500% at room temperature and improving a nail pull strength of the building board relative to an identical building board without the spray coating.

2. The composite building board as described in claim 1 wherein the coating comprises less than 2 grams of polymer per square foot of the decorative outer face and the nail pull strength is greater than 10% higher than an identical building board without the polymer based coating.

3. The composite building board as described in claim 2 wherein the coating polymer comprises a synthetic polymer.

4. The building board as described in claim 3 wherein the coating polymer has a glass transition temperature below 30 degrees Celsius.

5. The building board as described in claim 3 wherein the coating polymer has a glass transition temperature above 5 degrees Celsius and below 25 degrees Celsius.

6. The building board of claim 3 wherein the coating is less than 100 microns thick.

7. The building board as described in claim 6 wherein the coating is less than 50 microns thick.

8. The composite building board as described in claim 2 wherein the coating polymer comprises a polymer selected from acrylics and acrylic copolymers, vinyl acetate polymers and copolymers, styrene-butadiene polymers and copolymers, or polyvinyl alcohols.

9. The composite building board of claim 2 wherein the coating polymer comprises one of the following:
a copolymer containing vinyl acetate and ethylene;
a copolymer containing styrene and butadiene; or
a poly vinyl alcohol.

10. The composite building board of claim 9 wherein the coating is less than 100 microns thick.

11. The building board as described in claim 1 wherein the coating polymer has an elongation at break of between greater than 500% and up to 10,000%.

12. The building board as described in claim 11 wherein the coating polymer has a tensile modulus above 500 psi and up to 10,000 psi.

13. The building board as described in claim 12 wherein the coating polymer further comprises at least one of the following:
a copolymer containing vinyl acetate and ethylene;
a copolymer containing styrene and butadiene;
or a poly vinyl alcohol.

14. The building board as described in claim 13 wherein the coating is less than 100 microns thick.

15. The building board as described in claim 2 wherein the coating is applied as an aqueous solution.

16. The building board as described in claim 2 wherein the coating is applied as an aqueous dispersion.

17. The building board as described in claim 2 wherein the coating is not uniform across the width of the board.

18. The building board as described in claim 17 wherein the coating is more than 20% thicker in the center of the board than at the edges.

19. The building board as described in claim 18 wherein the coating polymer comprises one of the following:
a copolymer containing vinyl acetate and ethylene;
a copolymer containing styrene and butadiene;
or a poly vinyl alcohol.

20. The building board as described in claim 19 wherein the coating is less than 100 microns thick.

21. The building board as described in claim 1 wherein the coating polymer comprises one of the following:
a copolymer containing vinyl acetate and ethylene;
a copolymer containing styrene and butadiene;
or a poly vinyl alcohol.

22. The composite building board of claim 21 wherein the coating is less than 100 microns thick.

23. The building board as described in claim 1 wherein the coating polymer comprises one of the following:
a copolymer containing styrene and butadiene;
or a poly vinyl alcohol.

24. The building board as described in claim 23 wherein the coating is less than 100 microns thick.

25. A composite building board with enhanced nail pull strength, the composite building board comprising:
an exterior paper face forming a decorative outer face of the building board;
a set plaster core positioned beneath the exterior paper face, the set plaster core formed from a cementitious slurry of predominantly calcium sulfate hemi-hydrate; and
a polymer based spray coating applied directly to the exterior paper face of the building board wherein the coating comprises less than 10 grams of polymer per square foot of the decorative outer face, the spray coating leaving between about 10% to about 20% of the decorative outer face uncoated, the spray coating having a tensile modulus above 500 psi and an elongation at break of greater than 500% at room temperature and improving a nail pull strength of the building board relative to an identical building board without the spray coating.

26. A composite building board with enhanced nail pull strength, the composite building board comprising:
an exterior paper face;
a set plaster core positioned beneath the exterior paper face, the exterior paper face facing away from the set plaster core, the set plaster core formed from a cementitious slurry of predominantly calcium sulfate hemi-hydrate, and
a polymer based spray coating applied directly to the exterior paper face of the building board in a non-uniform manner, the spray coating leaving between about 10% to about 20% of the exterior paper face uncoated, the spray coating having a tensile modulus above 500 psi and an elongation at break of greater than 500% at room temperature and improving a nail pull strength of the building board relative to an identical building board without the spray coating.

27. The composite building board as described in claim 26 wherein the composite building board includes a center line and opposing lateral edges and wherein the polymer based coating is thicker along the center line.

28. The composite building board a described in claim 26 wherein the composite building board includes a center line and opposing lateral edges and wherein the polymer based coating is thinner along the opposing lateral edges.

29. The composite building board as described in claim 26 wherein the polymer coating includes thicker and thinner areas and wherein the thicker areas comprises less than 10 grams of polymer per square foot of the exterior face.

30. The composite building board as described in claim 26 wherein the set plaster core is formed with a plurality of internal voids.

31. A composite building board with enhanced nail pull strength, the composite building board comprising:
first and second liners, the first liner having an interior face and an exterior paper face forming a decorative outer face of the building board;
a set plaster core positioned between and bonded with the interior face of the first liner and the second liner, the set plaster core formed from a cementitious slurry of predominantly calcium sulfate hemi-hydrate, the set plaster core being formed with a plurality of internal voids, the internal voids functioning to decrease the overall weight of the building board; and
a polymer based spray coating applied directly to the exterior paper face, the polymer based spray coating being applied in an uneven manner across the decorative outer face, the spray coating leaving between about 10% to about 20% of the decorative face uncoated, the spray coating having a tensile modulus above 500 psi and an elongation at break of greater than 500% at room temperature and improving a nail pull strength of the building board relative to an identical building board without the spray coating.

32. The composite building board as described in claim 31 wherein the coating comprises less than 10 grams of polymer per square foot of the decorative outer face.

33. The composite building board as described in claim 31 wherein the coating polymer comprises a synthetic polymer.

34. The composite building board as described in claim 31 wherein the composite building board includes a center line and opposing lateral edges and wherein the polymer based coating is thicker along the center line.

35. The composite building board as described in claim 31 wherein the composite building board includes a center line and opposing lateral edges and wherein the polymer based coating is thinner along the opposing lateral edges.

\* \* \* \* \*